(12) United States Patent
Sowerby et al.

(10) Patent No.: US 8,915,380 B2
(45) Date of Patent: Dec. 23, 2014

(54) SEPARATOR FOR LOW DISCHARGE APPLICATIONS

(75) Inventors: John Sowerby, Pagosa Springs, CO (US); Richard Sowerby, Kelowna (CA); Douglas F. Samuelson, Frisco, TX (US); Jonathan Owen, Southport (GB)

(73) Assignee: Goslyn, LP, McKinney, TX (US)

( * ) Notice: Subject to any disclaimer, the term of this patent is extended or adjusted under 35 U.S.C. 154(b) by 161 days.

(21) Appl. No.: 13/518,480

(22) PCT Filed: Dec. 23, 2010

(86) PCT No.: PCT/US2010/062102
§ 371 (c)(1),
(2), (4) Date: Aug. 14, 2012

(87) PCT Pub. No.: WO2011/079316
PCT Pub. Date: Jun. 30, 2011

(65) Prior Publication Data
US 2012/0312739 A1    Dec. 13, 2012

Related U.S. Application Data

(60) Provisional application No. 61/290,166, filed on Dec. 24, 2009.

(51) Int. Cl.
*B01D 17/032* (2006.01)
*E03F 5/16* (2006.01)
*B01D 17/02* (2006.01)
*C02F 1/40* (2006.01)

(52) U.S. Cl.
CPC ........ *B01D 17/0211* (2013.01); *B01D 2221/02* (2013.01); *C02F 1/40* (2013.01); *E03F 5/16* (2013.01); *B01D 17/0214* (2013.01)
USPC .......... 210/521; 210/532.1; 210/540

(58) Field of Classification Search
CPC ... C02F 1/40; C02F 2209/42; B01D 17/0208; B01D 17/0211; B01D 17/0214; B01D 2221/02; E03F 5/16
USPC .......... 210/744, 800, 801, 104, 521, 522, 210/532.1, 538, 540
See application file for complete search history.

(56) References Cited

U.S. PATENT DOCUMENTS

| | | | | |
|---|---|---|---|---|
| 1,200,951 A | * | 10/1916 | Kelly | 210/540 |
| 3,971,719 A | * | 7/1976 | Peters | 210/104 |
| 4,123,365 A | * | 10/1978 | Middelbeek | 210/521 |
| 4,132,645 A | * | 1/1979 | Bottomley et al. | 210/104 |
| 4,132,652 A | * | 1/1979 | Anderson et al. | 210/521 |

(Continued)

*Primary Examiner* — Christopher Upton
(74) *Attorney, Agent, or Firm* — Roger N. Chauza, PC

(57) ABSTRACT

A separator 252 for immiscible liquids comprises a tank having an inlet, a separation chamber and an outlet chamber 262, with the inlet 12 feeding effluent into the separation chamber 28 at or below a maximum acceptable flow rate. The effluent is separated into a more dense and less dense fractions in the separation chamber 28. The separation chamber 28 is in communication with the outlet chamber 262, where the more dense fraction exits. An outlet 260 for the less dense fraction is in communication with the separation chamber 28 and has a lowermost exit level at which the less dense fluid exits. The more dense fluid cannot rise to the level of the lowermost level, and the height of the less dense fluid is such that it will exit through the outlet as the more dense fluid passes over the weir.

20 Claims, 15 Drawing Sheets

(56) References Cited

U.S. PATENT DOCUMENTS

| | | | |
|---|---|---|---|
| 4,396,508 A * | 8/1983 | Broughton | 210/522 |
| 4,400,274 A * | 8/1983 | Protos | 210/521 |
| 5,132,010 A * | 7/1992 | Ossenkop | 210/540 |
| 5,560,826 A * | 10/1996 | Szereday et al. | 210/540 |
| 5,616,245 A | 4/1997 | Albrecht | |
| 5,637,234 A * | 6/1997 | McCasland | 210/801 |
| 6,517,715 B1 * | 2/2003 | Batten et al. | 210/521 |
| 2003/0127376 A1 | 7/2003 | Maddock et al. | |
| 2005/0016937 A1 * | 1/2005 | Smullin | 210/800 |
| 2008/0149553 A1 | 6/2008 | Sowerby et al. | |

* cited by examiner

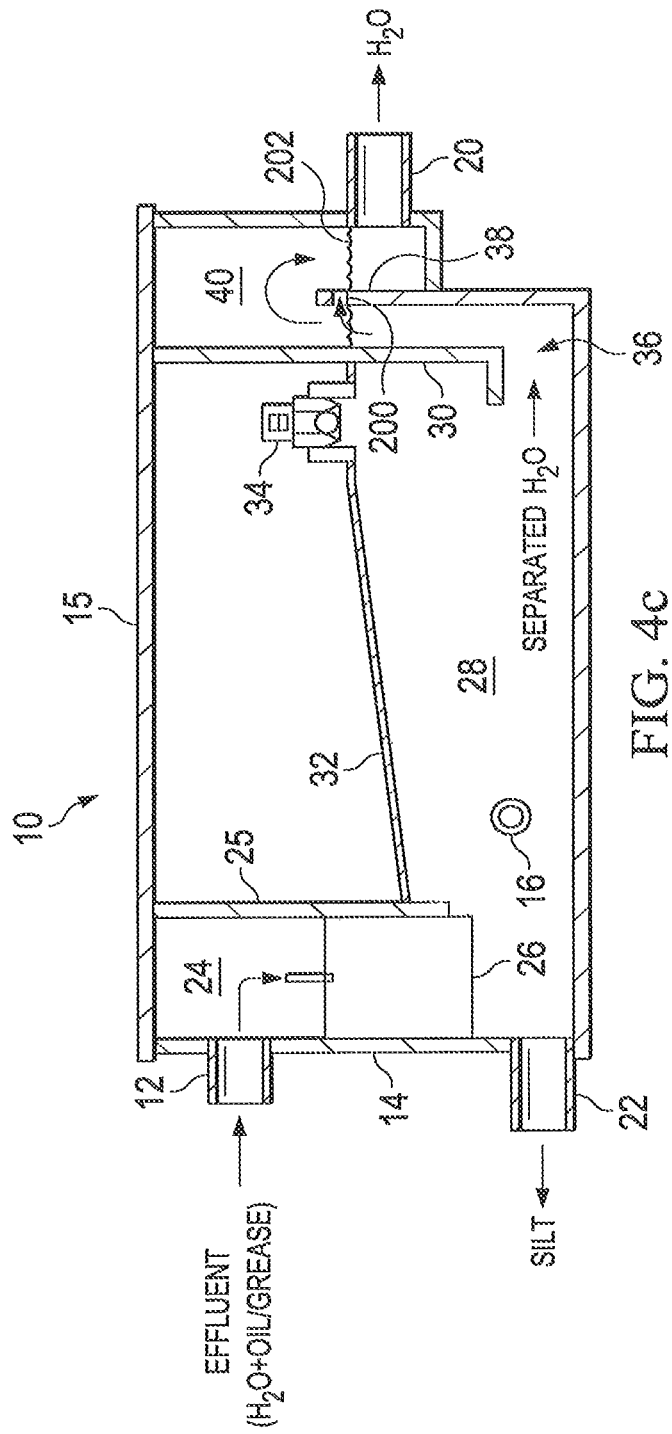

SEPARATOR FOR LOW DISCHARGE APPLICATIONS

RELATED APPLICATION

This section 371 patent application claims the benefit of U.S. provisional application Ser. No. 61/290,166, filed Dec. 24, 2009.

TECHNICAL FIELD

This invention relates in general to liquid separation devices and, more particularly, to a device which separates oil and/or grease from water in applications with a near-floor wastewater discharge outlet.

BACKGROUND ART

In several industries, and in particular the food industry, there is a need to separate liquid greases, fats and oils from waste water prior to passing the water to the sewage system. The waste water could be, for example, discharged from a washing device for cleaning dinnerware and cooking utensils. If the greases and fats solidify in the sewage system, a blockage can occur which is expensive to remediate.

Additionally, there is a movement in many localities to recycle grease and oils.

A commercially available separation device of the type described in European Patent EP 890381 B1 is shown generally in FIGS. 1a and 1b. FIG. 1a illustrates an exterior perspective view of the separation device 10. Effluent (containing two or more immiscible liquids of different densities, typically water entrained with oil, grease dissolved fats and other particles) is received at inlet 12 providing a passage into housing 14 (including removable lid 15). Effluent is heated using a probe-type heater 16, which is coupled to an electrical connection. As described below, the immiscible liquids separate within housing 14, and the less dense material (e.g., grease and oils) empties into container 18. The more dense liquid (e.g., water) is discharged from water outlet 20. Silt may accumulate at the bottom of housing 14. The silt may be periodically discharged through silt outlet 22.

Operation of the separation device 10 is described in greater detail in connection with FIG. 1b (as well as EP 890381 B1, which is incorporated by reference). FIG. 1b illustrates a cross-sectional side view of the separation device 10. A coarse filtration chamber 24 is defined between the housing 14 and control plate 25, which extends the full width of the housing. As effluent enters the coarse filtration chamber 24 through inlet 12, it passes through a filtering basket 26, which filters out solid particles, such as undissolved fat and other food particles.

After passing through the basket 26, the effluent enters the separation chamber 28, defined by control plate (baffle) 25, control plate (baffle) 30 (which extends the full width of the housing), top plate 32 and the bottom of housing 14. There are two exits from the separation chamber: (1) through floating ball valve 34 and (2) through passage 36, disposed between the bottom of control plate 30 and the bottom of the housing 14. Top plate 32 is angled upward from the bottom portion of control plate 25 towards control plate 30.

Weir plate 38, which extends the full width of the housing, defines a water (high density liquid) release chamber 40, along with control plate 30 and the housing 14. Outlet 20 is disposed through the housing.

In operation, as the effluent enters the separation chamber 28, the lower density liquid (grease/oil) rises. The flow through the separation chamber 28 is set at a rate that allows the lower density liquid to separate from the water and float upwards to the surface of the water, where it is contained below the sloping top plate 32.

The sloping top plate 32 forces the lower density liquid to accumulate at the entry to floating ball valve 34. Floating ball valve 34 is shown in greater detail in connection with FIG. 2. Floating ball valve 34 uses a ball that floats at the interface between the high density liquid and the low density liquid. When the high density liquid reaches a predetermined height, the ball rises to a height which stops flow from the separation chamber 28 to the container 18.

As the water flows through the separator 10, it must rise above the top of weir 38 in order to exit. Accordingly, the water in separation chamber 28 attempts to rise to approximately the same height. Since the top of the separation chamber 28 is below the top of weir plate 38, the hydrostatic pressure of the upward force of the water will push the separated grease/oil at the top of the separation chamber 28 through valve 34. The water, however, cannot pass through the valve 34, because the floating valve will stop its passage. Hence, once all the separated grease/oil is forced out of the separation chamber, the valve will remain closed until more grease/oil accumulates.

The separated water passes through passage 36, over weir plate 38 and out outlet 20. Silt in the water tends to accumulate at the bottom of housing 14, unable to rise over weir plate 38. Silt valve 22, located at the bottom of housing 14, can be opened periodically, and the flow of water out of the valve will flush out the silt.

This separator, along with other existing separators, operates based on very specific levels of the waste water inlet, water outlet and byproduct outlet. The valve 34 is an effective mechanism for preventing water from entering the removable tank; otherwise water would mix with the grease/oil in the tank 18 and quickly fill the removable tank. Usually, the valve 34 includes a ball which rises and falls at the boundary of the separated fluids. While the ball is reliable in blocking water from getting into the tank 18, it is not reliable in releasing once the water level has dropped below a safe level. Often, the ball will stick in a closed position due to one of the fluids preventing the oil/grease from entering the removable tank 18 as well as the water.

In many fields of use for the separator 10, and in particular the food industry, it can be assumed that the employees who will operate and maintain the separator will be relatively transient between employers. Accordingly, aspects of the operation and maintenance of the separator must allow for unfamiliarity with details. Matters such as periodic cleaning of various components of the separator, such as the floating ball valve, if performed incorrectly, can lead to unwanted consequences, such as allowing water to exit into the oil/grease container or oil/grease flowing out of the outlet 20. Further, a backsplash of grease may occur when cleaning the valve, which can result in both the employee and the surrounding area to be soiled with grease.

Some alternatives to a valve such as this are set forth in U.S. Pat. No. 7,297,284, which is incorporated by reference herein. The valves shown in the patent either ameliorate factors which cause sticking, or eliminate sticking through electromechanical assist; however, these valves are typically more complicated and much more expensive than the ball valve.

Therefore, a need has arisen for a separator that operates without valve mechanisms which can stick in a set position.

DISCLOSURE OF THE INVENTION

A separator for immiscible liquids includes a tank having an inlet, a separation chamber and an outlet chamber, with the inlet feeding effluent into the separation chamber at or below a maximum acceptable flow rate and with the separation chamber in communication with the outlet chamber, wherein effluent separates into a denser immiscible fluid and a less dense immiscible fluid in the separation chamber, A first outlet is in communication with the separation chamber having a lowermost exit level at which the less dense fluid exits. The outlet chamber includes a weir having a top over which the more dense fluid flows prior to exiting the outlet chamber via a second outlet, the lowermost level and the weir top having relative heights such that an uppermost height, of the less dense liquid rises to a height above the lowermost exit level of the first outlet at least occasionally as the more dense fluid flows over the weir, while the height the denser liquid flowing over the weir cannot rise above the lowermost exit level for a flow rate at or below the maximum flow rate.

The present invention provides significant advantages over the prior art. Using the invention, no valve is needed to prevent the more dense fluid from exiting via the first outlet, where it would mix with the less dense fluid.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a through 4c illustrate a modified weir for providing additional force to release a ball in a floating ball valve;

FIG. 6b illustrates a first embodiment of a variable height weir used in connection with the separator of FIG. 6a;

BEST MODE FOR CARRYING OUT THE INVENTION

The present invention is best understood in relation to FIGS. 1-13 of the drawings, like numerals being used for like elements of the various drawings.

Figure 2:
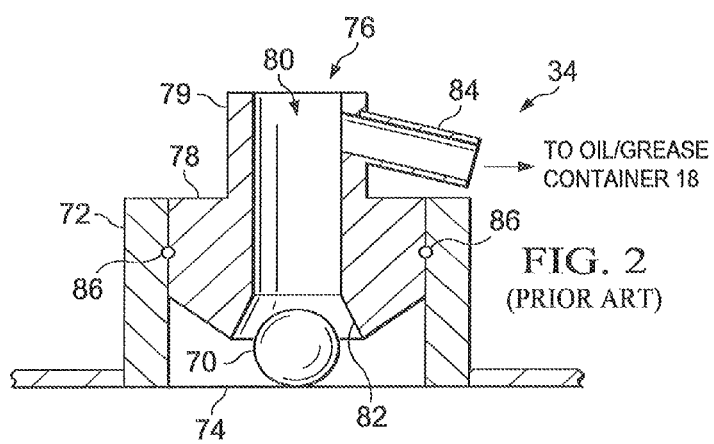
FIG. 2 illustrates a prior art floating ball valve used in the separation device of FIGS. 1a and 1b.

FIG. 2 illustrates a type of floating ball valve 34 used in the prior art. Floating ball valve 34 includes a ball 70 within housing 72. Ball 70 is held within housing 72 by a grid 74. Insert 76 includes a mating portion 78 for mating with the housing 72 above the ball 70 and an outlet portion 79 for communicating with the oil/grease container 18. A passage 80 is formed in insert 76 through the mating portion 78 and outlet portion 79, with a tapered opening 82 at the end of the passage 80. Passage 80 is coupled to outlet 84. O-ring 86 seals mating portion 78 and housing 72. As described above, the ball 70 is designed to float at the interface between two immiscible liquids (e.g., water and oil/grease). As the water rises, the oil/grease is pushed into passage 80, where it exits to the oil/grease container 18 via outlet 84. Once all of the lower density liquid (oil/grease) has been pushed into the passage 80, the ball 70 presses against the tapered opening 82, thereby closing the passage. In this way, only the lower density liquid can pass through the passage 80.

Since the oils and grease will pass through the passages 80 and 84 to the oil/grease container 18, the passages 80 and 84 need to be cleaned periodically to remove congealed substances. To do so, a brush is inserted into the passage 80 from above or into passage 84 from the side, and up and down scrubbing motion is used to dislodge the congealed oil/grease within the passage 80. During the cleaning process, the mating portion 78 can easily become dislodged from the housing 72, causing failure of the valve 34.

Figure 3A:
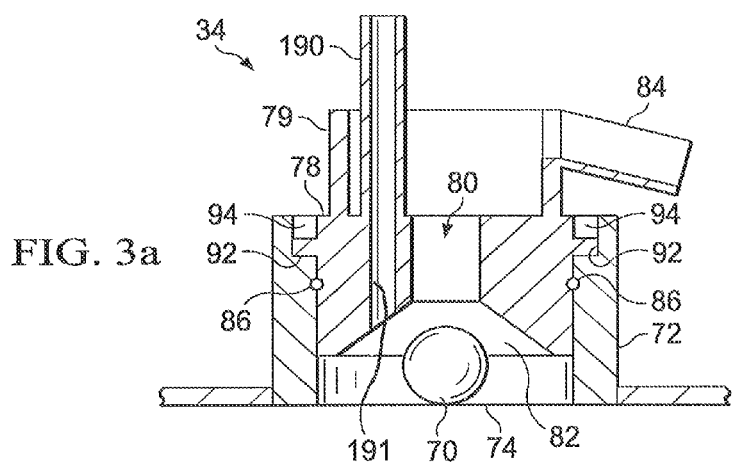
FIGS. 3a and 3b illustrate a floating ball valve with a breather tube.
Figure 3B:
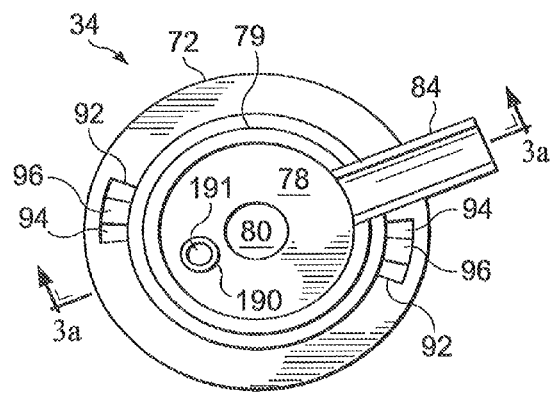

FIGS. 3a and 3b illustrate a cross-sectional side view and a top view, respectively, of an embodiment of a ball valve 34 with an integral breather tube 190. In this embodiment, a breather tube hole 191 is formed through mating portion 78, with the tube 190 extending upwards from hole 191 to a level near lid 15, or other level that will ensure that hydrostatic pressure will not force oil/grease out of the breather tube 190. Additionally, FIGS. 3a and 3b illustrate outlet 84 as a trough, rather than a pipe. A trough configuration is generally easier to clean, and uses less material.

Figure 4A:
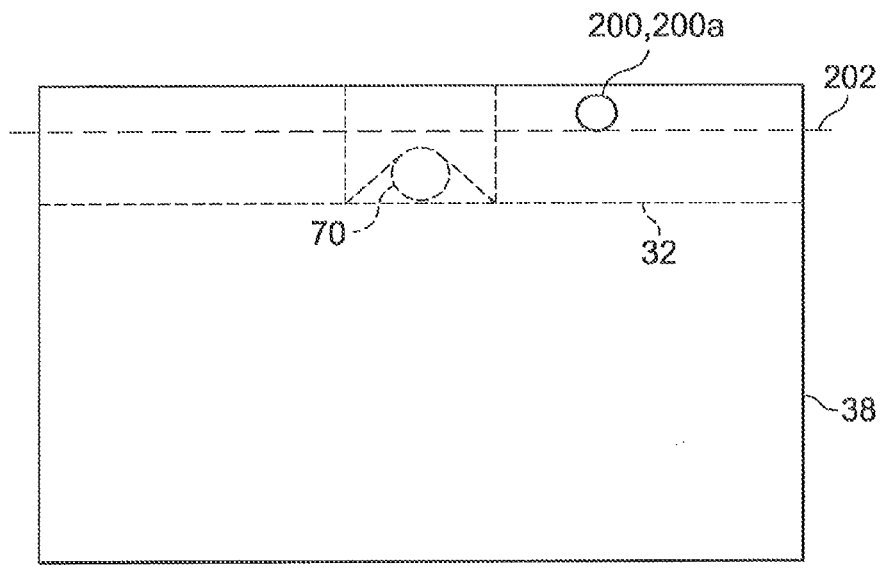
Figure 4B:
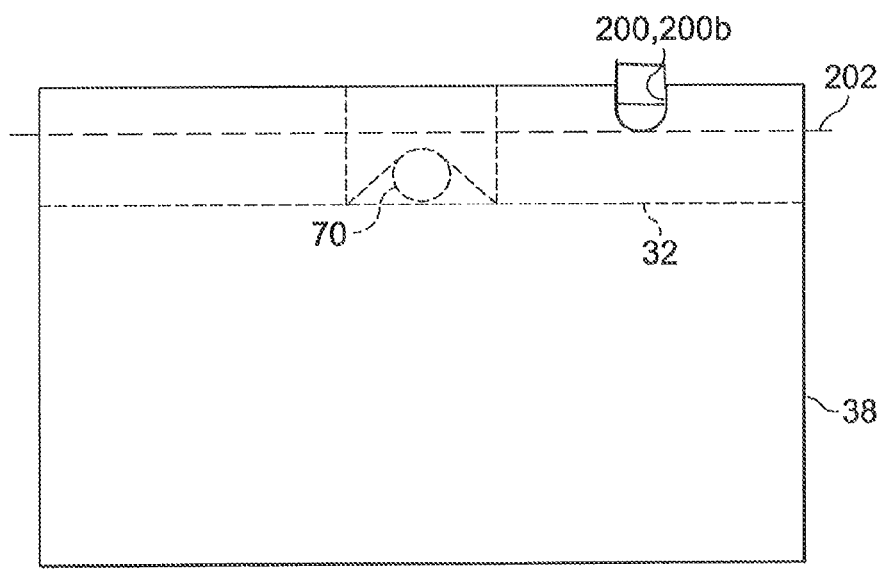

FIGS. 4a through 4c illustrate embodiments of a separation device using a modified weir 38 which applies a downward force to a ball 70 stuck in a valve 34. Under normal conditions, the ball 70 should be pressed against the valve by a rising more dense fluid in order to prevent the more dense fluid from passing through the valve. When more of the less dense fluid rises to the top plate 32, the ball should fall away from the valve due to the weight of the less dense fluid in the valve. Unfortunately, the weight of the less dense fluid in the valve is sometimes insufficient to move the ball, and thus cause the valve to be stuck in a closed state.

In FIGS. 4a and 4b, a bypass hole 200 (individually referenced as bypass holes 200a and 200b) is formed through the weir, having a lowermost point slightly below the top of the weir and above the bottom of the valve. When the separator is idle, the level of the more dense fluid will drop to the lowermost point of the hole 200. The drop from the top of the weir to the lowermost point of the hole can be on the order of 8 mm.

In operation, when effluent is being input to the separator, the more dense liquid (e.g., water) will flow over the top of the weir 38, although a small amount will flow through the bypass hole 200. In the prior art, for example in the device of FIG. 1b, when the effluent ceases to be input to the separator, the water level would stay at the top of the weir. However, using a weir 38 with a bypass hole 200, as shown in FIG. 4c, with a lowermost opening level at 202, when effluent input ceases, water will flow through bypass hole 200 and the water level will lower itself (for example, by 8mm) to the level of lowermost opening level 202.

Effectively, this adds an additional 8 mm of less dense fluid above the ball that will push down on the ball to overcome any sticking forces between the ball and the opening.

The speed at which the water level drops can be modified by changing the size of the hole 200. While a round hole 200a is shown in FIG. 4a and a slot is shown in FIG. 4b, any shape of hole can be used to allow the water level to drop below a desired level 202 for creating the suction force on the ball 70.

Figure 4D:
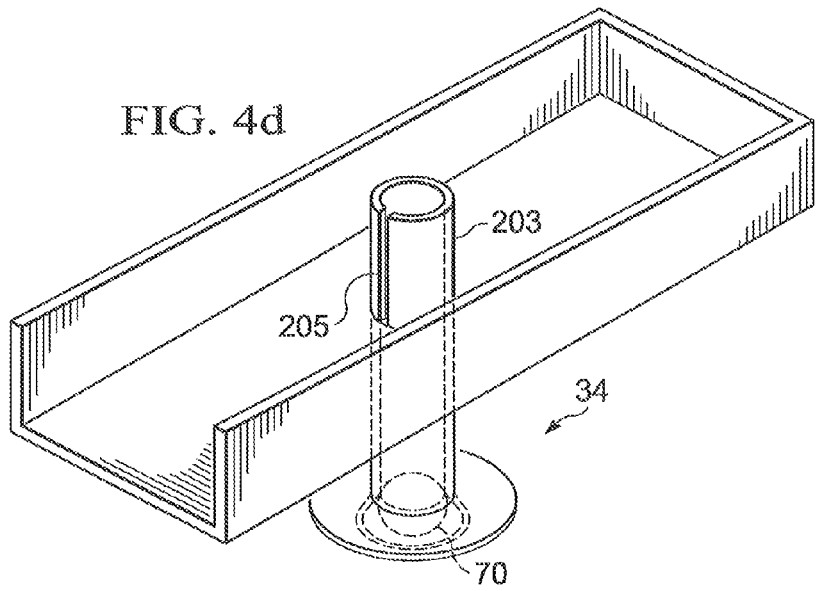
FIGS. 4d and 4e illustrate a valve with a slotted riser for controlling the ball valve during varying effluent flow rates.
Figure 4E:
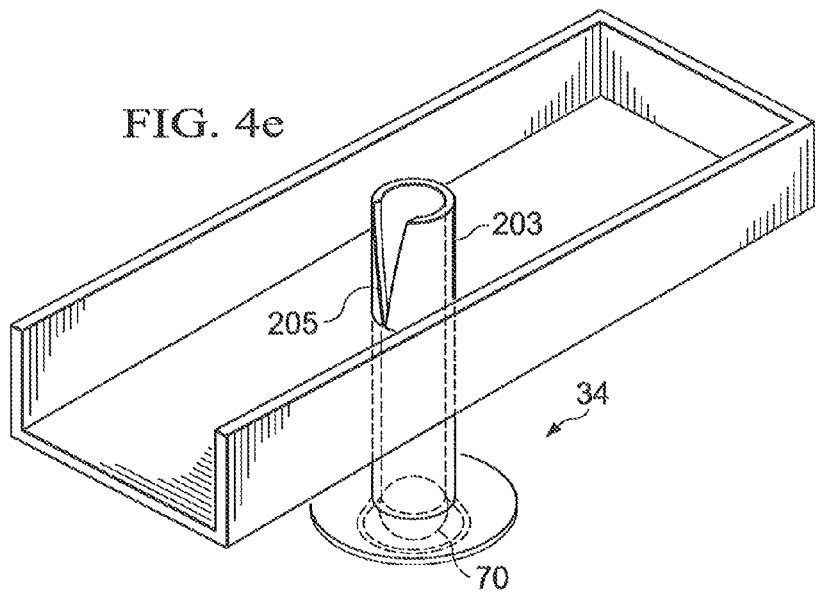

FIGS. 4d and 4e illustrate a ball valve with a slotted riser which controls oil flow through the valve during periods of varying effluent flow rates to keep the ball from being stuck in the valve due to a high flow of oil through the valve. In this embodiment, the ball valve 34 includes an extended riser portion 203 of the outlet portion 79 with a slot 205. In FIG. 4d, the slot 205 is a straight slot, while in FIG. 4e, the slot is "V" shaped. Oil forced through the passage 80 rises to the slot, which has a bottom which has a height approximately 5 mm above the top of the weir 38. The top of the slot is approximately 10 mm above the weir 28.

In operation, at low water flows, the oil will pass through the bottom portion of the slot 205, as the oil will pass through the slot 205 before it can accumulate in the riser 203. When an increased effluent flow results in more oil separating in the separation tank and, hence, a higher flow of oil through the ball valve 34, the height of the oil in the column will increase, which will decrease the upward velocity of the oil though the valve. The decreased velocity of oil through the valve will allow the ball 70 to stay at its natural buoyancy level at the interface between the oil and water. The riser 203 and slot 205 thus act as a damper to prevent abrupt changes in the flow rate of the less dense fraction through the valve 34.

Figure 5A:
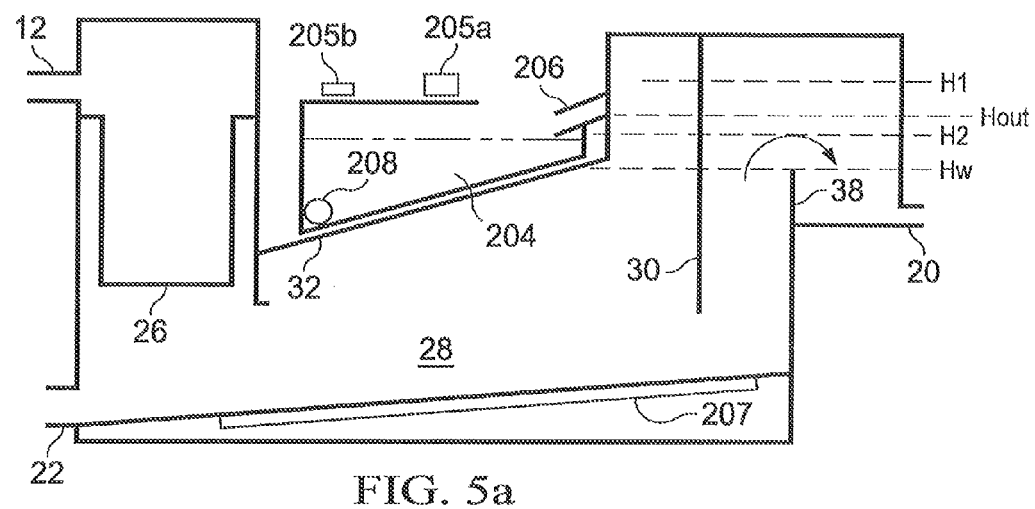
FIGS. 5a and 5b illustrate side and top views of a separator which eliminates the need for a ball valve.
Figure 5B:
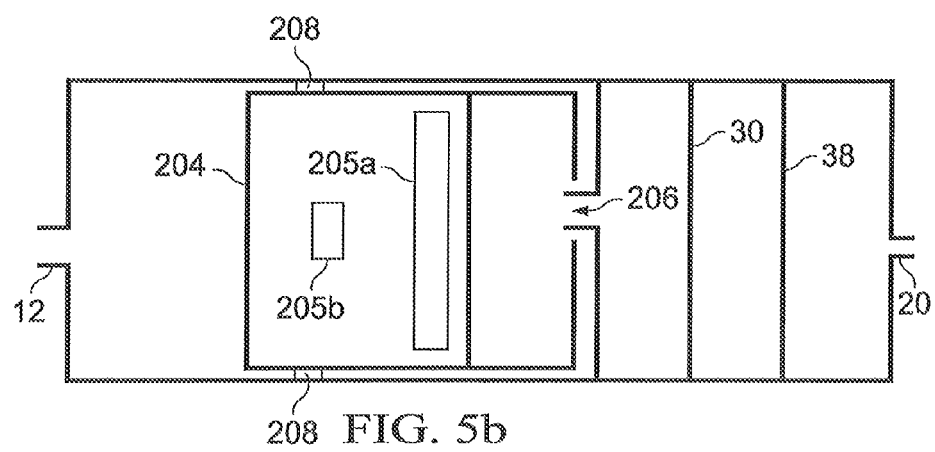

FIGS. 5a and 5b illustrate side and top views of a generalized embodiment of a separator which eliminates the need for a valve by controlling the level of the more dense fluid flowing over weir 38 relative to the lowermost level of an exit hole for the less dense fluid with respect to a difference of height between the more dense and the less fluids. As described above, the valve is necessary in the prior art, because the water level in the design shown in FIG. 1b is above the top plate 32 and the valve stops the more dense fluid (i.e., water) from entering the cassette 18.

Figure 1A:
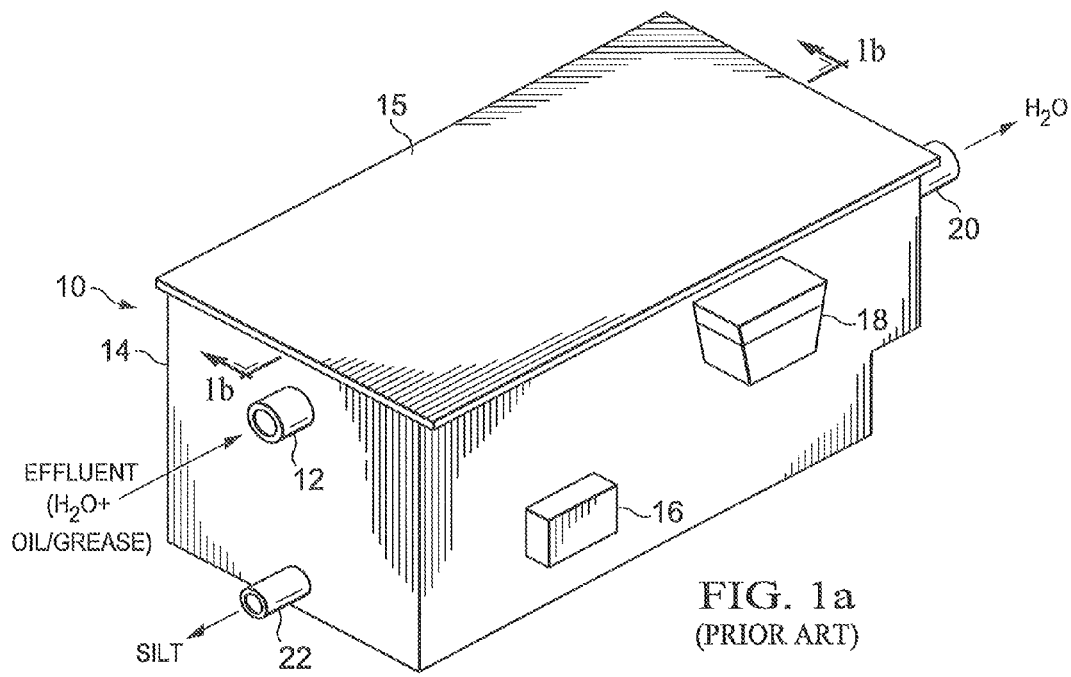
FIGS. 1a and 1b illustrate a perspective view and a cross-sectional view of a prior art separation device.
Figure 1B:
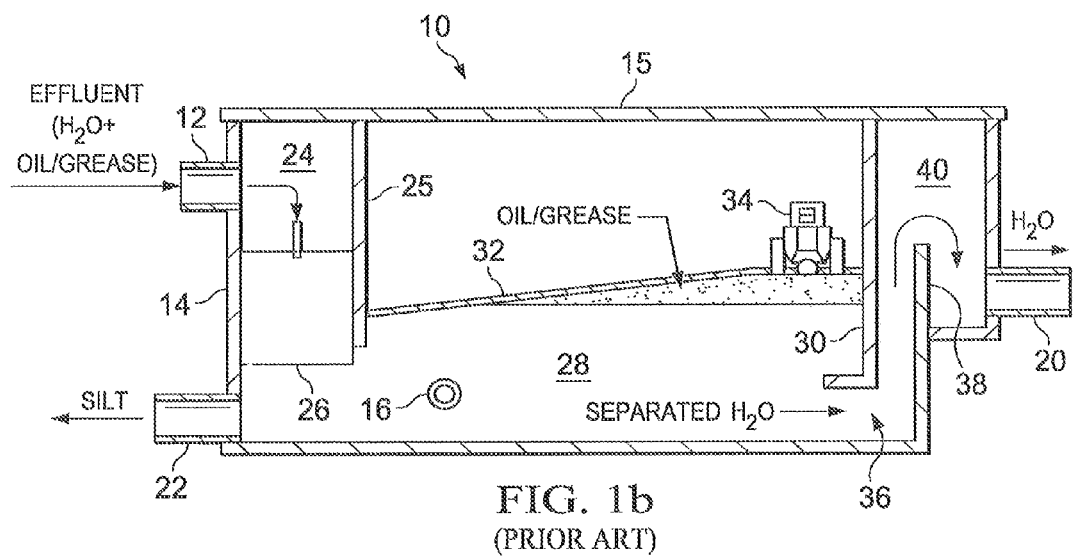

In FIGS. 5a and 5b similar components with that of FIGS. 1a and 1b are designated by the same reference numerals. Differences to note are that the top of the weir 38 (Hw) may be below the apex of the top plate 32 (it could also be above the apex of the top plate), there is no valve in top plate 32, a cassette 204 with handles 205a and 205b for capturing the less dense fraction is provided above the top plate in the illustrated embodiment and an outlet 206 which passes the less dense fraction to a lowermost opening at height Hout, where Hout>Hw. A silicone heater 207 is placed under the slanted base portion. Alternatively, the silicone heater could be placed between the top plate 32 and the cassette 204. Also, side discharge ports could be placed at 208. The cassette 204 can be lifted from the unit and emptied while the unit is not running. Alternatively, oil could be pumped from the cassette into a larger storage container.

Referring to FIG. 5a, there are four heights which may vary during operation of the separator, although in a given implementation, less than all four may vary: (1) the height of the weir, Hw, (2) the height of the more dense fraction as it flows over the weir, H2, (3) the height of the lowermost opening of the outlet 206, Hout and (4) the height of the less dense fraction (determined as if there was no outlet), H1.

Two immiscible fractions of different specific gravities will separate under force of gravity into two layers in a calculable or measurable time period (according to Stokes Law) with the lighter of the two liquids being in the top layer. If the heavier liquid is allowed to flow under a vertical or inclined separation plate that has an aperture at the bottom (such as control plate 30), it will rise after the separation plate to a level that is lower than the lighter liquid on the other side of the plate. Thus, H1>H2. The difference in levels between the two fractions can be calculated based on the relative height and specific gravity of each liquid. For example, for a less dense fraction of cooking oil, having height H1 at specific gravity SG1, and a more dense fraction of water having a height H2 and a specific gravity SG2:

| Height of Oil H1 mm | SG of Oil SG1 | SG of Water SG2 | Height of Water – H2 mm = SG1 * H1/SG2 | Height Difference = H1 – H2 |
| --- | --- | --- | --- | --- |
| 50 | 0.94 | 1 | 47 | 3 |
| 75 | 0.94 | 1 | 71 | 4 |
| 100 | 0.94 | 1 | 94 | 6 |

If the mixture of two immiscible liquids is introduced into a chamber at a known flow rate, then the chamber can be sized to ensure that separation is completed before the heavier liquid only flows under the separation plate. The height of the heavier liquid flowing over the fixed height weir (H2−Hw) can be calculated using the Francis Formula.

Accordingly, several implementations are provided below that exploit these potential variables to allow the less dense fluid to flow into the cassette 204 through outlet 206, without the height of the more dense fluid (H2) reaching the bottom of the outlet (Hout).

In FIGS. 6a-b through 7a-b, the difference between Hout and Hw is varied in order to accommodate a variation in H2 due to changes in the rate of flow through the separator. As the flow increases, H2 will increase in accordance with the Francis formula. A max height H2max can be determined at the maximum rated flow for the separator using the Francis formula, or determined empirically.

Figure 6A:
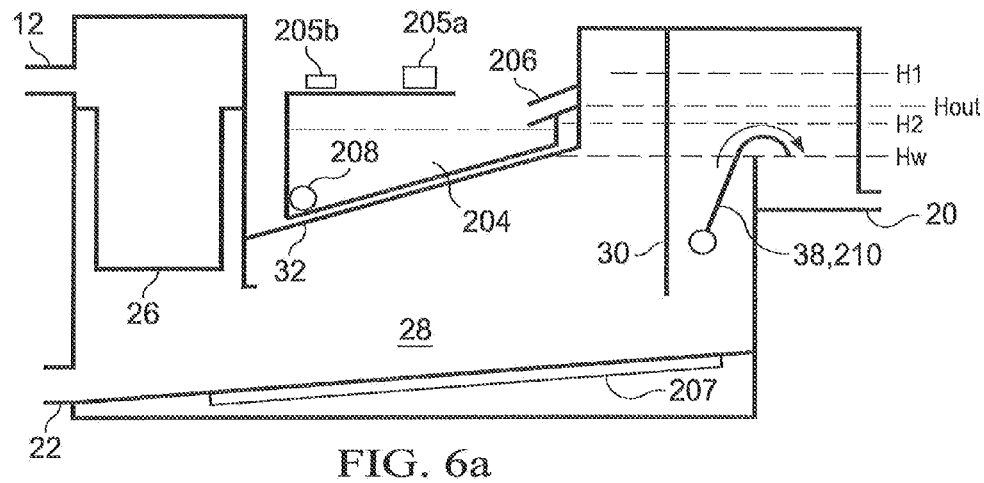
FIG. 6a illustrates a side view of an embodiment of a separator of the type described in connection with FIGS. 5a-b, with a variable height weir.

Importantly, H2max must remain below Hout, otherwise the more dense fluid could flow through the outlet 206. On the other hand, as long as H2max<Hout, it is not possible that the more dense fluid can flow through the outlet 206. In FIG. 6a, the H2max is maintained below Hout, by lowering the height of the weir, Hw, as the flow over the weir increases and raising the height of the weir as the flow over the weir decreases. Similarly, it is possible to raise Hout in response to an increase in flow and lower Hout in response to a decrease in flow. Finally, both Hout and Hw could be varied responsive to flow.

Figure 6B:
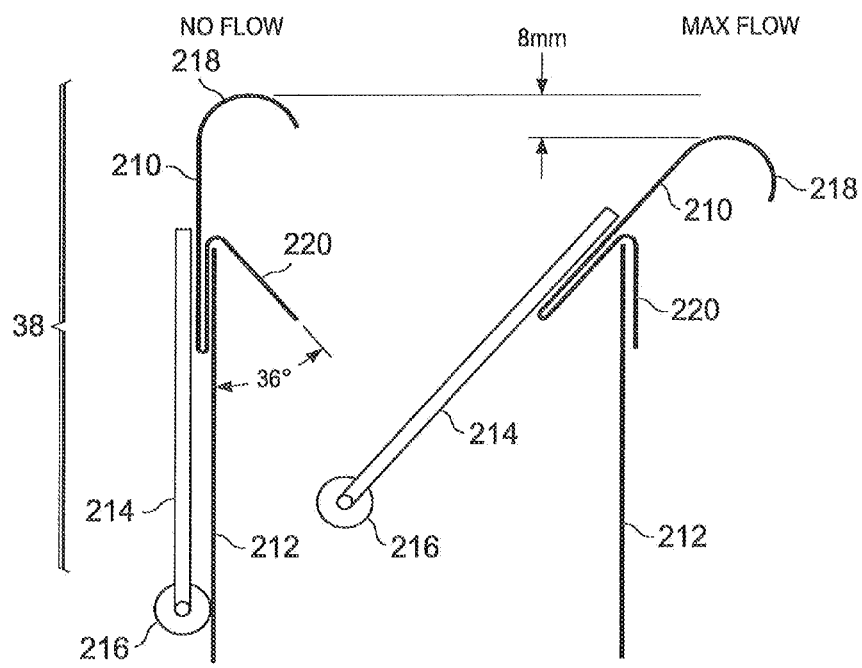

Raising or lower Hw could be accomplished in many different ways. In FIGS. 6a-b, the weir 38 is formed by a pivoting weir 210 on top of a fixed weir 212. The pivoting weir 210 can be comprised of sheet steel, for example, with wires 214 holding counterweights 216. The pivoting weir preferable uses a curved top portion 218. The curved top translates the flow over the weir into a lateral force which causes the pivoting weir 210 to pivot according to the rate of the flow. A hanger portion 220 provides a fixed angle of possible rotation −36 degrees in the illustrated embodiment. The curve shape enables a predictable and even drop in the vertical height for each degree of inclination during an initial period of increasing flow. So, when the separator receives a burst of effluent, the increased speed of the more dense fraction over the weir will cause the pivoting weir 210 to pivot. As the pivoting weir pivots, the decrease in the effective height of the weir offsets the increase in the height of the more dense fraction over the weir.

In operation, as the degree of pivoting increases, the height of the weir (Hw) decreases. In the illustrated embodiment of FIG. 6b, Hw decreases by up to 8 mm from a vertical position to a rotated position of 36 degrees.

In this embodiment, the pivoting weir 210 is designed such that H2 remains relatively constant during operation of the device—H2 is approximately equal to Hw with the weir in the vertical position. Accordingly, if Hout is slightly greater than Hw (in the vertical position), then H2 will always be below Hout.

Figures 7A, 7B:
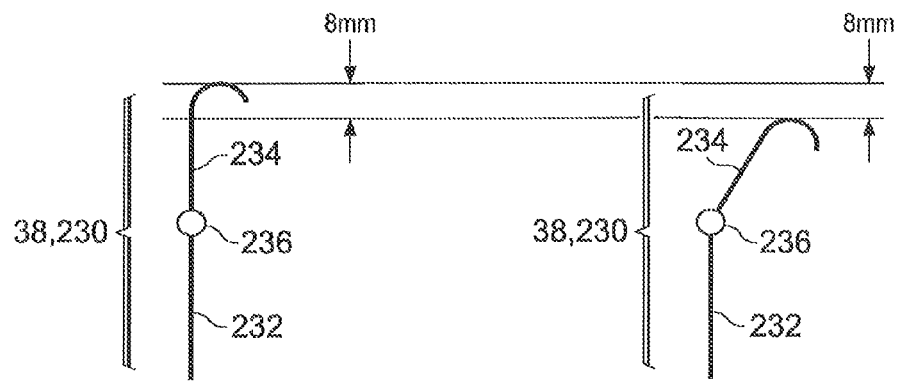
FIGS. 7a and 7b illustrate a second embodiment of a variable height weir.

FIG. 7a through 7b illustrates alternative embodiments for a variable height weir. In FIG. 7a, a hinged weir 230 has a fixed portion 232 and a rotating portion 234 about hinge 236. The hinge can be spring loaded to provide resistance, or the rotating portion could be coupled to springs between the rotating portion 234 and a wall, either in tension or compression. Hinge 236 could be provided on the base of the separator, without a fixed portion.

Figure 8:
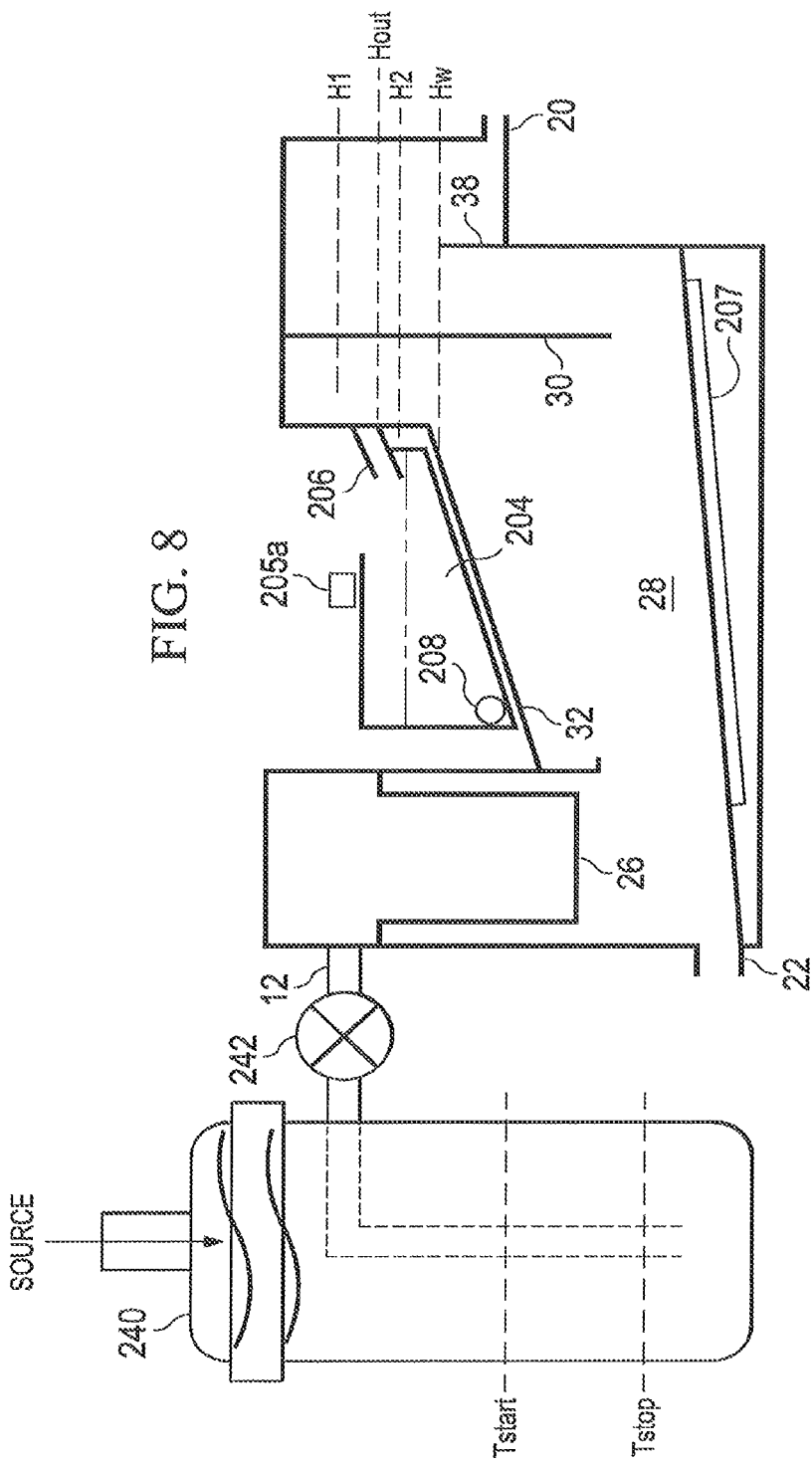
FIG. 8 illustrates a side view of an embodiment of a separator of the type described in connection with FIGS. 5a-b, with a fixed flow rate.

FIG. 8 illustrates an embodiment of the separator which provides a constant flow, with a fixed height weir and a fixed height outlet, such that Hout, Hw and H2 all remain constant during operation of the separator. Since the source of the effluent often has a variable flow rate, an intermediary container 240 receives the effluent from the source and a pump 242 pumps effluent from the container 240 to the separator at a constant rate. The pump starts when the level in the intermediary container 240 is above a first threshold (Tstart) and stops when the level in the intermediary container 240 is below a second threshold (Tstop).

In operation, when the pump 242 is active, the height of the more dense fraction (H2) will be constant. As long as H2 is slightly below Hout, the less dense fraction will exit via the outlet into the cassette and the more dense fluid will never reach height Hout, so it cannot flow into the outlet.

Figure 9:
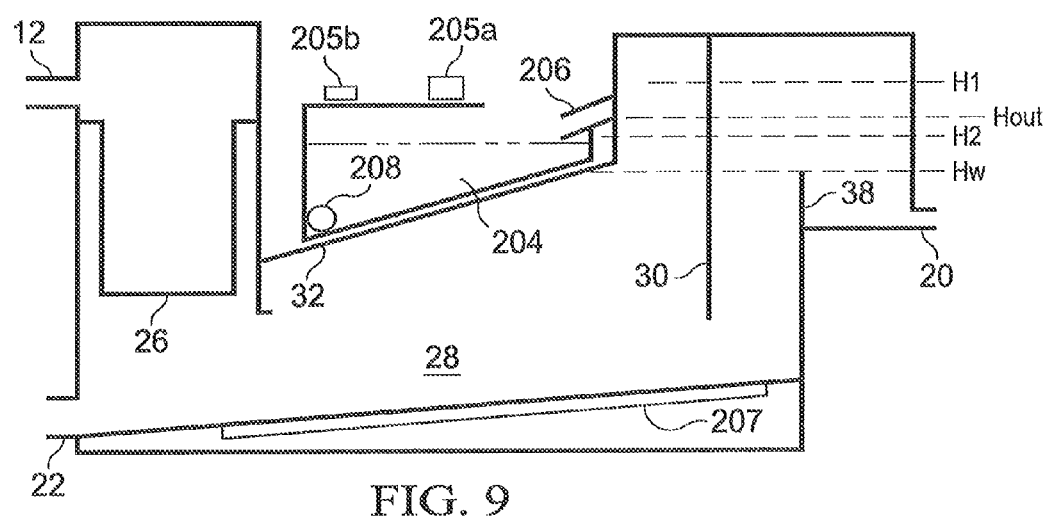
FIG. 9 illustrates a side view of an embodiment of a separator of the type described in connection with FIGS. 5a-b, with a fixed weir and variable flow rate.

FIG. 9 illustrates an embodiment of the invention wherein a fixed height weir and a fixed height outlet are used, without controlling the flow rate. In this embodiment, the height differential between the two fractions is calculated; for example, using the cooking oil/water scenario above, for an H1 of 75 mm, a differential of 4 mm will exist between the heights of the less dense and more dense fractions. The weir is then designed such that at maximum flow rate, the height of the water does not exceed the differential (in this case 4 mm).

Figure 10A:
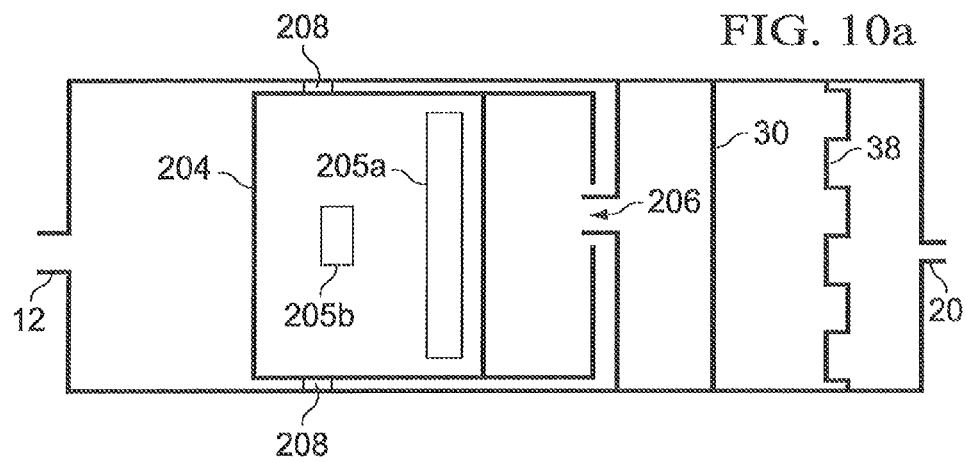
FIGS. 10a through 10c illustrate serpentine weirs for a longer length within a specified width separator.
Figure 10B:
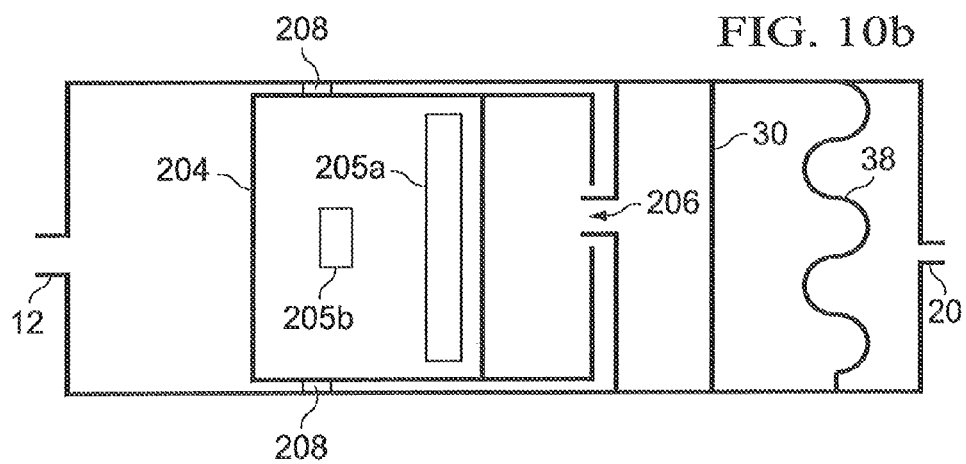
Figure 10C:
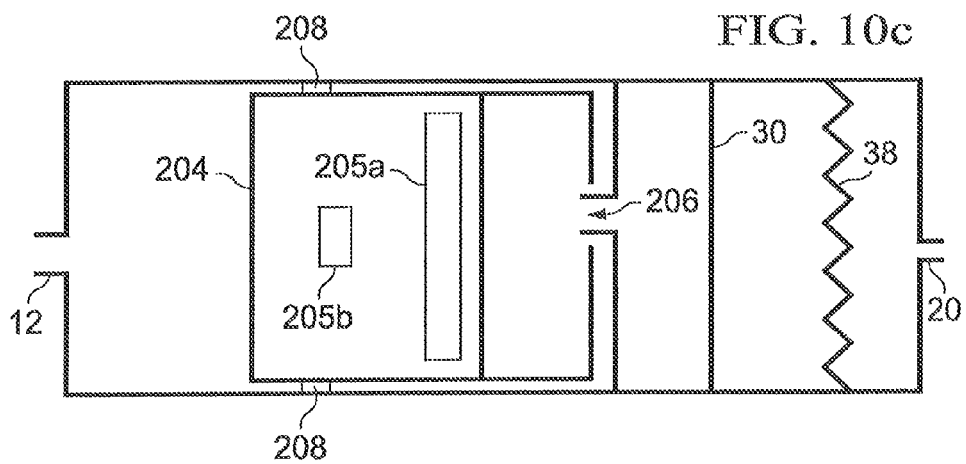

The height of the more dense fluid over the fixed weir will be dependent largely upon the length of the weir. Thus, for a separator of a given maximum flow, the 30 length of the weir can be adjusted to keep (H2max−Hw)<(HI−H2). In some instances, the length of the weir may be greater than the desired width of the separator. If this is the case, the weir can be effectively lengthened by making the weir serpentine in shape rather than straight. FIGS. 10a through 10c illustrate some of the variations that could be used for a longer weir within a separator having a width less than the length of the weir.

Figure 11A:
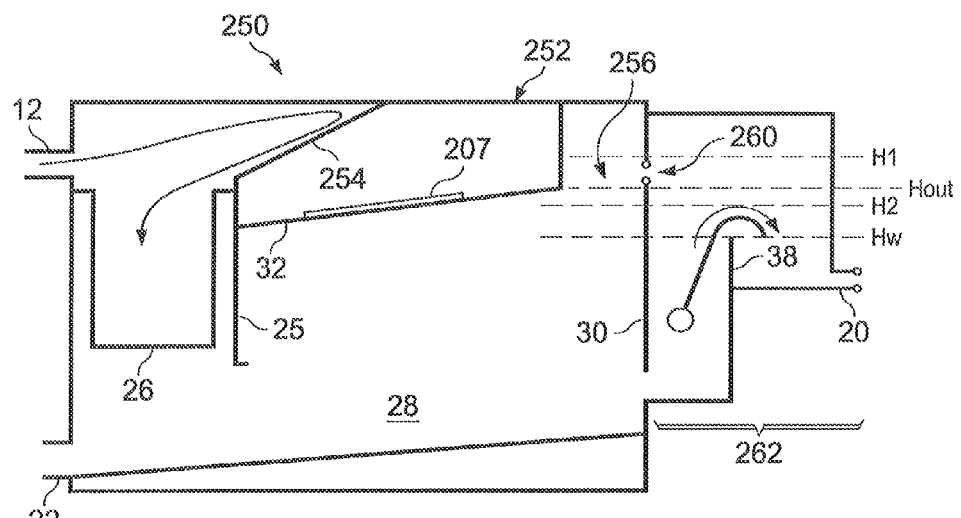
FIGS. 11a through 11c illustrate a preferred embodiment of a separator with no oil valve.
Figure 11B:
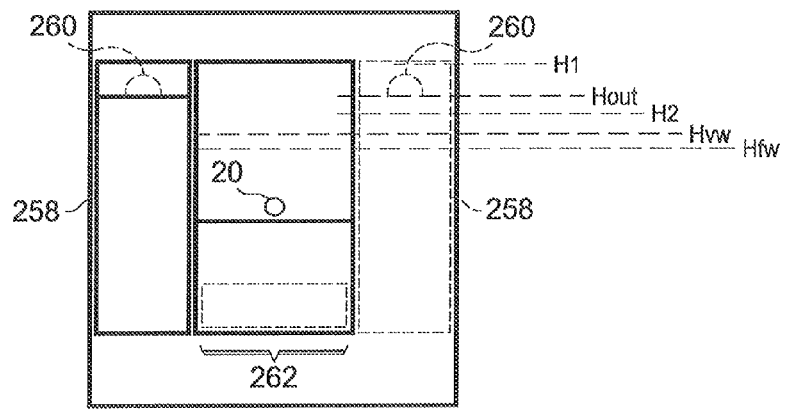
Figure 11C:
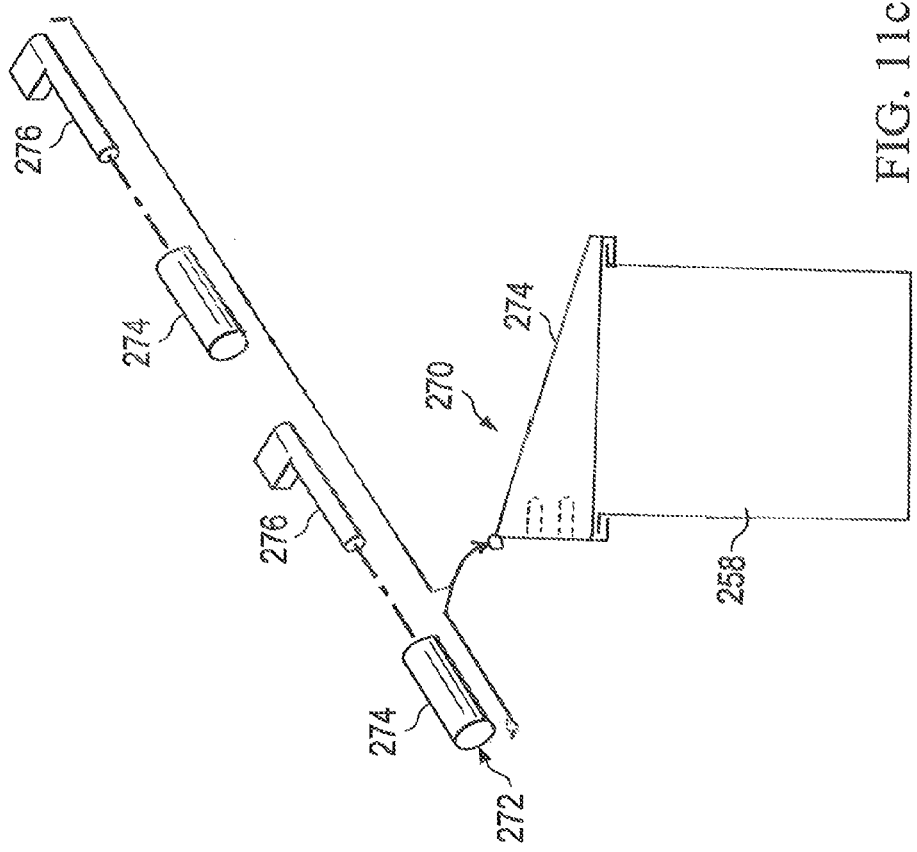

FIGS. 11a-11c illustrate an embodiment of the invention which features an external oil container that can be used on either side of the separator, without a valve. The separator 250 has an oil control insert 252 which fits tightly within the separator 250 using a neoprene gasket or other seal. The oil control insert 252 provides several functions. First, the oil control support 252 fits onto a lip of the basket support and provides a sloped overshoot portion 254. The overshoot portion 254 will catch incoming effluent that enters the separator 250 in a surge and overshoots the basket 26. Surges can result in an unexpected increase in the flow of water over the weir, even if the flow is within the rated flow, so the overshoot portion reduces the energy of the surging effluent before is transmits that energy to the effluent in the separation chamber.

A second function of the oil control insert 252 is that it can contain the silicone heater 207. The heater can be easily serviced by simply removing the oil control insert.

A third function of the oil control insert 252 is that it provides the top plate 32 for the separation chamber and forms a channel 256 into which the less dense fraction rises.

As the level in the separation chamber increases, the less dense fraction will flow into channel 256, where the less dense fraction will pass into an oil cassette 258 (see FIG. 11b) though hole 260. Oil cassette 258 is shown in greater detail in connection with FIG. 11c.

As can be seen in FIG. 11b, the back of the separator 250 has a weir section 262 for capturing the more dense fluid, where the weir section 262 is positioned in the center of the back of the unit 250. The oil cassette 258 can be placed on either side of the weir section 262 (or both sides) in order to accommodate various placements of the separator 250.

FIG. 11c illustrates an embodiment of a removable oil cassette 258. A cassette lid 270 is mounted on the separator to communicate with hole 260. In a preferred embodiment, the lid is mounted with a hinge 272 having two sleeves 274 that can be pushed onto respective pins 276 on either side of the unit. The lid 270 can be easily removed for cleaning. Further, hinged lid 270 makes it easy to clean the oil chute.

A container 258 slides into the lid and captures the less dense fraction. When the separator is not active, the container can be removed to empty the less dense fraction.

Tables 1 through 4 illustrate an example of an embodiment of the device shown in FIGS. 11a-c, supporting a 25 GPM (gallon per minute) flow rate, where a dwell time of 30 seconds (27 second is minimum acceptable dwell time) is achieved to allow the oil and water adequate time to separate given the dimensions, which are similar in footprint to existing devices using a ball valve-specifically, dimensions of 36 length by 14 inches width by 14 inches height and a footprint of 36 inches length by 20 inches width by 14 inches height, with an inlet invert of 9 inches. Thus, it is possible to achieve 25 GPM with a dwell time of 30 seconds with a unit that measures 36×14×14 inches with a 9 inch inlet invert and a final weir range of 15 mm. The oil cassette can be made of two sections measuring 18×6×9 inches high, each of which holds 25 lbs of grease. An overflow between the first and second cassette enables a total of 50 lbs to be stored, although, typically, the primary cassette will be emptied before it overflows.

TABLE 1

| | | Dimensions | | |
|---|---|---|---|---|
| | | Dimensions from floor | Dimensions measured from top down | inches |
| Establish the maximum height of the inlet invert to suit the site conditions expected- assume 50 mm pipe. | D1 | 230 | 125 | 9.06 |

TABLE 1-continued

| | | Dimensions from floor | Dimensions measured from top down | | inches |
|---|---|---|---|---|---|
| | | Dimensions | | | |
| This sets maximum height for the top of the self adjusting final weir. The gaps around the adjusting weir will allow the level to drop at no flow so the weir can be level with the invert of the inlet pipe. | D2 | 230 | 125 | 4 mm difference is critical | 9.06 |
| The oil overflow is 4 mm above the top of the self adjusting weir | D3 | 234 | 121 | | 9.21 |
| Level of apex of control plate is level with the oil overflow (4 mm above final weir) - then vertical to top of unit | D4 | 234 | 121 | | 9.21 |
| Level of control plate at first baffle plate is 25 mm lower than apex of control plate | D5 | 209 | 146 | | 8.23 |
| Level of bottom of first baffle below pressure plate - 25 mm | D6 | 184 | 171 | | 7.24 |
| | D7 | 15 | 340 | | 0.59 |
| Level of bottom of unit above floor under second baffle plate is 65 mm above bottom | D8 | 65 | 290 | | 2.56 |
| Level of bottom of second baffle is 50 mm above bottom of unit to allow same area as exit to weir | D9 | 115 | 240 | | 4.53 |
| Level of bottom plate under inlet is 15 mm above bottom | D20 | 65 | | | 2.56 |
| Average level of bottom plate under first baffle plate = 45 mm | D21 | 45 | | | 1.77 |
| Length of inclined part of control plate is equal to length between first and second baffle plates less 25 mm. | D22 | 654 | | | 25.75 |
| Height - Top of unit is 125 mm minimum above inlet invert | D10 | 355 | | | 13.98 |
| Clearance needed for basket, including height add 200 (Basket depth reduced from 200 to 120 plus 80 for handle) | | 555 | | | 21.85 |
| Exit pipe is 95 mm below weir | D11 | 135 | 220 | | 5.31 |
| Inlet chamber is 118 mm long | D12 | 118 | 118 | | 4.65 |
| Exit chamber is 110 mm long | D13 | 110 | 98 | | 4.33 |
| Distance from second baffle to weir is 50 mm | D14 | 50 | 48 | | 1.97 |
| Distance from weir to end of unit | D23 | 60 | | | 2.36 |
| Width of unit | D16 | 355 | 355 | | 13.98 |
| Overall length of unit | D24 | 907 | 907 | | 35.71 |

TABLE 2

Dwell Volume Calculation
Establish the dwell volume. The volume of liquid between the two baffles plus the volume in the inlet chamber must allow a dwell time of 27 seconds to allow the oil to separate and float to the top before it passes under the second baffle. This volume will be the maximum true capacity of the unit.

| | | | |
|---|---|---|---|
| Length of area between first and second baffle plates is length of control plate plus 25 mm for oil surge area | D15 | 679 | 26.73 |
| Area of liquid for separation = D15 × D16 in sq mm | A1 | 241045 | |
| Volume = D16/1000000 × (((D4 − D8) × D15 − (D15 * .5 * (D21 − D8)) − (D15 − D22) × .5 × (D4 − D5))) | V1 | 43 | |
| Volume of liquid in inlet chamber = D12 × D16 × (D2 − D9)/1000000 in litres | V2 | 5 | |
| Calculated Dwell volume = V1 + V2 in Litres | | 48 | |
| Actual capacity in Litres per second = Dwell volume divided by 27 | | 1.77 | |
| Actual Capacity in Litres per Hour | | 6,380 | |

TABLE 2-continued

Dwell Volume Calculation
Establish the dwell volume. The volume of liquid between
the two baffles plus the volume in the inlet chamber
must allow a dwell time of 27 seconds to allow the oil to
separate and float to the top before it passes under the
second baffle. This volume will be the maximum true
capacity of the unit.

| | |
|---|---|
| Actual capacity in GPM- | 28 |
| Rating in GPM | 25 |
| Dwell Time | 30 |

TABLE 3

Oil Cassette
SIZE OIL CASSETTE

ASME A112.14.3

| GPM | Lard lbs | Density | Vol cu ft | Vol cu ins |
|---|---|---|---|---|
| 25 | 50 | 49.5 | 1.01 | 1745 |
| Vol required | Length | Width | | Height Calc |
| 1745 | 36 | 6 | | 8 |

PDI G101

| GPM | Lard lbs | PDI G101 | lard lbs | Density | Vol cu ft | Vol cu ins |
|---|---|---|---|---|---|---|
| 25 | 50 | 12.50% | 56.25 | 49.5 | 1.14 | 1964 |
| Vol required | Height | Width | Length calc | | | |
| 1964 | 9 | 6 | 36 | | | |

TABLE 4

Adjustable Weir Range of Movement
ADJUSTABLE WEIR RANGE OF MOVEMENT
Calculate water height over weir for certified flow rates

| | W mm | W ins | W ft | H mm | H ins | H ft | FLOW cu ft/sec | Flow GPM |
|---|---|---|---|---|---|---|---|---|
| GOS No Ball | 355 | 13.98 | 1.16 | 3 | 0.118 | 0.010 | 0.004 | 2 |
| 25 GPM | 355 | 13.98 | 1.16 | 6 | 0.236 | 0.020 | 0.011 | 5 |
| | 355 | 13.98 | 1.16 | 10 | 0.394 | 0.033 | 0.023 | 10 |
| | 355 | 13.98 | 1.16 | 13 | 0.512 | 0.043 | 0.034 | 15 |
| | 355 | 13.98 | 1.16 | 15.5 | 0.610 | 0.051 | 0.044 | 20 |
| | 355 | 13.98 | 1.16 | 18 | 0.709 | 0.059 | 0.055 | 25 |

Francis Formula for flow over a weir: —
Flow = 3.33(W − 0.2H)H power 1.5
Flow in cu ft/sec
W = Width in ft
H = Height in ft
Adjustable weir must have range of height variation of 18 − 3 = 15 mm for flows ranging from 2 to 25 GPM FIGS. 12a-c and 13 illustrate embodiments where the height of the oil chute for collecting the oil (less dense fraction) rises and falls, within a certain range, with the height of the water (more dense fraction) that passes over the weir.

Figure 12A:
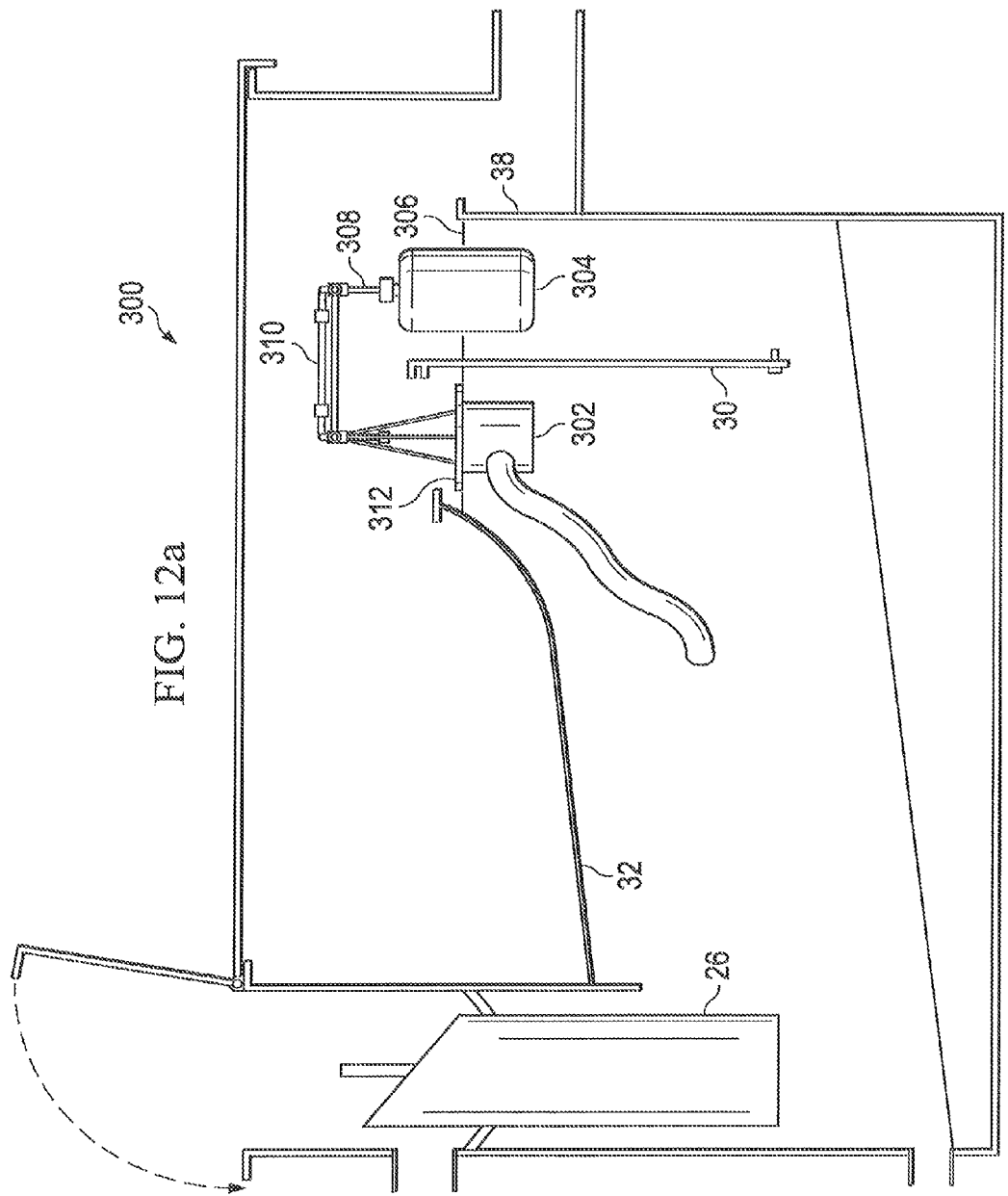
FIGS. 12a through 12c illustrate a first embodiment of a separator with a collection device which rises and falls with the height of the water over the weir.
Figure 12B:
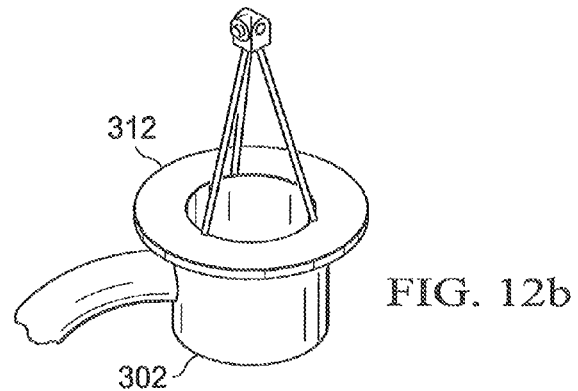
Figure 12C:
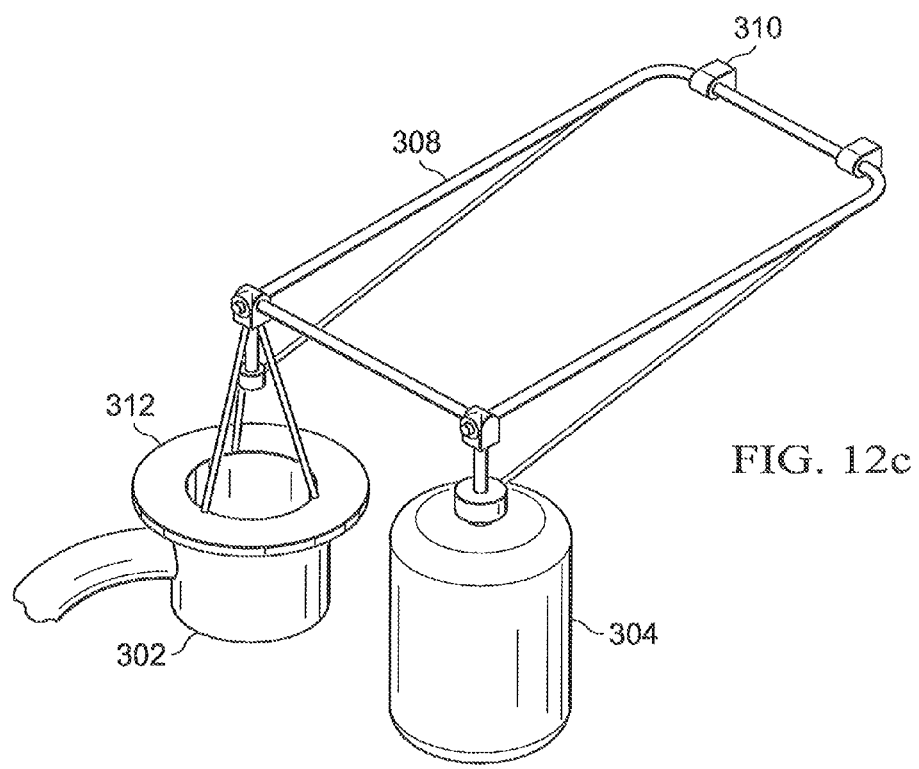

In FIGS. 12a-c, a separator 300 has an oil chute 302 linked to a float 304 with float line 306 through linkage 308, which pivots up and down at hinge 310. The top 312 of the oil chute 302 is a set distance above the float line 306, for example, 3mm.

In operation, when the water going over the weir rises and falls, the float 304 will rise and fall accordingly. The oil chute 302 will also rise and fall with the water level, with the top 312 of the oil chute 302 maintaining a height of 3 mm above the top of the water flowing over the weir. Thus, a big rush of water will cause the oil chute 302 to rise rapidly, preventing water in the separation area from being collected. Again, a valve is not needed to prevent water from getting into the oil collection, because the top 312 of the oil chute 302 will always be a predetermined distance above the water level in the separation area.

Oil collected in the oil chute 302 flows through a flexible, neutral buoyancy tube to a collection tank located on the separator.

Figure 13:
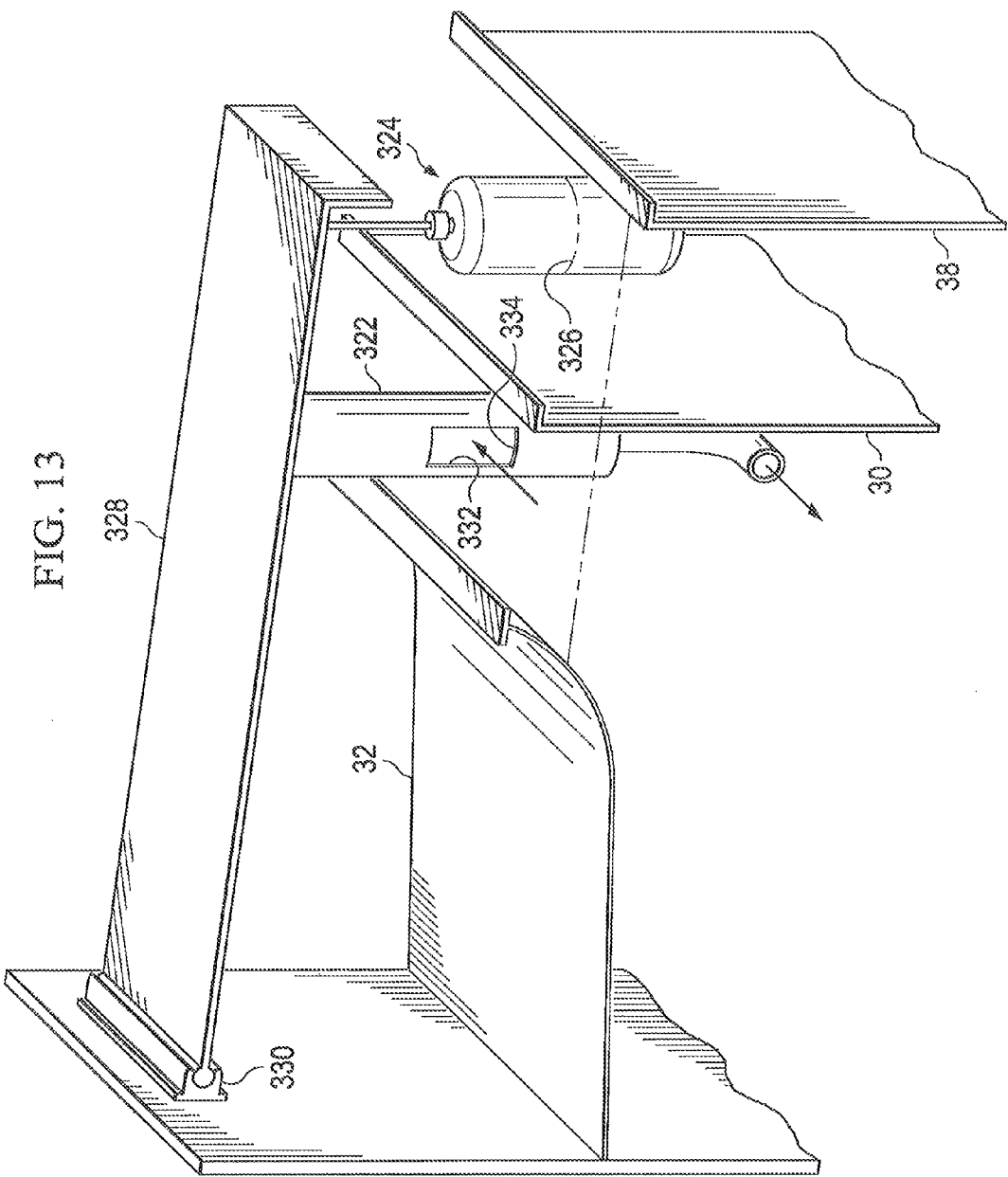
FIG. 13 illustrates a second embodiment of a separator with a collection device which rises and falls with the height of the water over the weir.

FIG. 13 illustrates a different embodiment where the float and oil chute are hinged on a plate behind basket 26. In this embodiment of the separator 320, the oil chute 322 is linked to the float 324 with float line 326 through linkage 328. Linkage 328 pivots up and down at hinge 330. Slot 332 of oil chute 322 has a lowermost portion 334 which is a predetermined height above the float line 326, such as 3 mm. Oil collected by chute 322 is passed to a collection tank through a flexible, buoyancy neutral tube.

In operation, when the water going over the weir 38 rises and falls, the float 324 will rise and fall accordingly. The oil chute 322 will also rise and fall with the water level, with the lowermost edge 334 of slot 332 maintaining a height of 3 mm above the top of the water flowing over the weir. A big rush of water will cause the float 324 to rise rapidly, preventing water in the separation area from being collected by the oil chute 322. A valve is not needed to prevent water from getting into the oil collection system, because the bottom 334 of slot 322 of the oil chute 302 will always be a predetermined distance above the water level in the separation area.

In both FIGS. 12a-c and 13, the float can be adjusted up or down to set the relationship with the oil chute to a proper distance for safely collecting oil.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:
1. A separator for immiscible liquids, comprising:
a tank having an inlet, a separation chamber and an outlet chamber, with the inlet feeding an immiscible effluent into the separation chamber, the separation chamber in communication with the outlet chamber, wherein the immiscible effluent separates into a more dense liquid and a less dense liquid in the separation chamber, the less dense liquid exits the separation chamber via a first outlet, and the more dense liquid exits the outlet chamber via a second outlet;

the first outlet of the separation chamber having a lowermost exit level to which the less dense liquid must rise in order to exit through the first outlet, the less dense liquid flows from the separation chamber through the first outlet without being controlled by a valve mechanism that prevents the more dense liquid from flowing through the first outlet;

the outlet chamber including a weir having a top over which the more dense liquid flows prior to exiting the outlet chamber via the second outlet, said weir having a height that self-adjusts as a function of a flow of the more dense liquid thereover;

said weir comprising a lower fixed weir portion with an upper edge and an upper rotatable weir portion having an upper rounded edge over which the more dense liquid flows, said upper rotatable weir portion including an inverted v-shaped saddle member that rests on and rotates on the upper edge of said lower fixed weir portion; and the greatest height of said self-adjusting weir is less than a height of the lowermost exit level of the first outlet of the separation chamber, whereby the more dense liquid exits the second outlet of the outlet chamber rather than the first outlet of the separation chamber.

2. The separator of claim 1, wherein the effluent flows at a varying rate, and wherein a relative distance between the top of the self-adjusting weir and the lowermost exit level of the first outlet varies in response to the rate of flow of the more dense liquid over the top of the upper rotatable weir portion in order to prevent the more dense liquid from rising above the lowermost exit level of the first outlet.

3. The separator of claim 2, wherein the relative distance between a height of the more dense liquid flowing over the upper rotatable weir portion and the lowermost exit level of the first outlet is less than four millimeters.

4. The separator of claim 1, wherein the height of the top of the upper rotatable weir portion rises and lowers in response to a flow rate of the effluent into the separator.

5. The separator of claim 1, wherein said upper rotatable weir portion is removable from said lower fixed weir portion by lifting said upper rotatable weir portion from the upper edge of said lower fixed weir portion.

6. The separator of claim 5, wherein said upper rotatable weir portion includes a counterweight that rotates said upper rotatable weir portion toward a position where said upper rounded edge is at a maximum height.

7. The separator of claim 1, wherein the inverted v-shaped saddle member of said upper rotating weir portion includes a downwardly depending hanger that engages said lower fixed weir portion to limit rotating movement of said upper rotating weir portion.

8. The separator of claim 1, wherein the lowermost exit level of the first outlet rises with increased flow of the more dense liquid over the weir.

9. The separator of claim 1, and further comprising a flow control mechanism to control the flow rate of the effluent into the separator such that the more dense liquid maintains a substantially static height when flowing over the self-adjusting weir.

10. The separator of claim 9, wherein the flow control mechanism includes a pump for controlling the flow of the effluent through the effluent inlet.

11. The separator of claim 10, wherein the flow control mechanism further comprises a holding tank for receiving the effluent, wherein the pump transfers the effluent from the holding tank to the effluent inlet of the separator tank.

12. The separator of claim 11, wherein the pump transfers the effluent from the holding tank to the effluent inlet after the effluent reaches a first threshold level in the holding tank, and stops after the effluent lowers to a second threshold level in the holding tank.

13. The separator of claim 1, wherein the upper edge of said lower fixed weir portion is level and straight.

14. A separator for separating immiscible liquids, comprising:
a separator tank with an effluent inlet;
a separation chamber for receiving an immiscible effluent from the effluent inlet, and for separating the immiscible effluent into a more dense liquid and a less dense liquid, the separation chamber having a first outlet;
an outlet chamber for receiving the more dense liquid separated from the immiscible effluent in the separation chamber, said outlet chamber having a weir with a top over which the more dense liquid flows to exit the outlet chamber via a second outlet; and
said weir comprising a lower fixed weir portion with an upper edge, and comprising an upper rotatable weir portion having an upper rounded edge over which the more dense liquid flows, said upper rotatable weir portion including an inverted v-shaped saddle member that rests on and rotates on the upper edge of said lower fixed weir portion, and said upper rotatable weir portion rotates as a function of a flow rate of the more dense fluid.

15. The separator of claim 14, wherein said upper rotatable weir portion is removable from said lower fixed weir portion by lifting said upper rotatable weir portion from the upper edge of said lower fixed weir portion.

16. The separator of claim 14, wherein said upper rotatable weir portion includes a counterweight that rotates said upper rotatable weir portion toward a position where said upper rounded edge is at a maximum height.

17. A separator for immiscible liquids, comprising:
a tank having an inlet, a separation chamber and an outlet chamber, with the inlet feeding an immiscible effluent into the separation chamber, the separation chamber in communication with the outlet chamber, wherein the immiscible effluent separates into a more dense liquid and a less dense liquid in the separation chamber, the less dense liquid exits the separation chamber via a first outlet, and the more dense liquid exits the outlet chamber via a second outlet;
the first outlet of the separation chamber having a lowermost exit level to which the less dense liquid must rise in order to exit through the first outlet, the less dense liquid flows from the separation chamber through the first outlet without being controlled by a valve mechanism that prevents the more dense liquid from flowing through the first outlet;
the outlet chamber including an adjustable height weir having a top over which the more dense liquid flows prior to exiting the outlet chamber via the second outlet;
said adjustable height weir includes a fixed portion and a pivoting portion, and said weir changes in height as the pivoting portion pivots, and said pivoting portion is attached to a spring; and
the top of the adjustable height weir having a height that is less than a height of the lowermost exit level of the first outlet of the separation chamber, whereby the more dense liquid exits the second outlet of the outlet chamber rather than the first outlet of the separation chamber.

18. The separator of claim 17, wherein the spring is a compression spring.

19. The separator of claim 17, wherein the spring is a tension spring.

20. The separator of claim 17, wherein the spring is a spring-loaded hinge.

* * * * *